Patented Feb. 11, 1947

2,415,402

UNITED STATES PATENT OFFICE 2,415,402

PROCESS FOR RECOVERY OF DINITROTOLUENE

Ludwig F. Audrieth, Dover, N. J., and Arthur H. Sweeney, Jr., United States Army No Drawing. Application May 23, 1944, Serial No. 537,018

3 Claims. (Cl. 260—645)

(Granted under the act of March 3, 1883, as amended April 30, 1928; 370 O. G. 757)

The invention described herein may be manufactured and used by or for the Government for governmental purposes, without the payment to us of any royalty thereon.

The present invention relates to a process for the recovery of dinitrotoluene, specifically to the recovery of dinitrotoluene from an adsorbent which has been employed to effect the removal of dinitrotoluene from the effluent waste waters obtained during the process of water drying smokeless powders.

One of the objects of this invention is to recover the dinitrotoluene values which remain in the adsorbent employed for the detoxication of the waste waters from the water dry. An important feature accomplished by this process is to effect regeneration of the adsorbent so that it may be employed and reused for the detoxication, that is, for the removal of additional dinitrotoluene from such waste waters. Another objective is to carry out such recovery and regeneration in a manner which introduces no industrial hazard to life and property, since dinitrotoluene is an explosive compound. These objectives are accomplished by solvent extraction of the adsorbate from the adsorbent-adsorbate system. The adsorbent may be any one of a number of commercially available materials possessing the ability of removing the dinitrotoluene from the water and holding it tenaciously. For convenience of description, the invention herein claimed will be described in its application to the recovery of dinitrotoluene from a particular adsorbent, i. e. activated charcoal, it being understood however that our invention is not to be limited in its application to the specific examples herein cited. The term adsorbate refers in this case to dinitrotoluene, which is in effect, a mixture of isomeric dinitrotoluenes, but consisting largely of the 2,4 isomer. Dinitrotoluene is employed in the manufacture of certain types of smokeless powder and because of its solubility in water is to a certain extent removed from the powder during the final water drying process. Because of its toxic effect on marine life and the danger to human life from possible contamination of drinking water supplies, it must be removed from effluent waters.

Ordinarily, an adsorbate may be removed by a number of processes, the simplest and easiest being the application of high pressure steam to the adsorbent-adsorbate system. In view of the tenacity with which dinitrotoluene is held to the activated charcoal, excessively high temperatures are required—temperatures at which appreciable and violent decomposition of dinitrotoluene occurs. Attempts to use such a steaming procedure on a small scale have resulted in explosions. It thus becomes impracticable and dangerous to life and property, to attempt dinitrotoluene recovery and regeneration of the adsorbent by use of high temperature steam.

We have found that dinitrotoluene can be removed effectively from charcoal by extraction from the adsorbate-adsorbent system by utilizing benzene or ether. Other solvents, characterized by the fact that they exhibit high solvent ability for dinitrotoluene, may also be used but we prefer water immiscible solvents since their recovery is thereby simplified. Thus, methylacetate and acetone are quite effective in removing dinitrotoluene from charcoal, but their subsequent recovery involves an expensive fractional distillation process. We actually prefer benzene to ether since the use of the latter results not only in excessive vapor losses, but involves installation of cooling equipment in the adsorbers and throughout the system to cut down such losses, and to make liquid phase extraction possible. In addition, smaller volumes of benzene are required per unit weight of dinitrotoluene recovered than is the case where ether is employed. Toluene and higher aromatic hydrocarbons may likewise be employed as extractants, but limitations imposed upon explosives manufacturing plants necessitate, from a safety point of view, the use of steam pressures no greater than five pounds. For reasons of economic operation and safety, benzene is, therefore, preferred, although we would not wish to be limited in the scope of our invention since conditions may be altered to justify the use of the other solvents mentioned herein.

Specific details as to equipment and apparatus necessary to effect the achievement of the several objectives of this invention need not be detailed here since they represent nothing novel. It is sufficient here to point out that extraction of dinitrotoluene from the adsorbent can be effected either by a continuous or batch method. Thus, the extractant, benzene for instance, may be passed continuously through the bed of the adsorbent, or a definite volume of benzene may be introduced and allowed to remain in contact with the adsorbent and then vented through an appropriate release valve. This extraction process may be carried out at room temperatures or at temperatures approaching the boiling point of the solvent, higher temperatures being preferred since quantities of solvent required are thereby reduced. For benzene, the preferred temperature range is from 40° to 70° C. In either case, after removal of much of the dinitrotoluene, the adsorbent must be steamed out to recover considerable quantities of benzene which remain adsorbed on the bed. This is an essential feature of our process since regeneration of the adsorbent is thereby effected, for if the residual benzene were not removed, not only would losses of solvent be excessive, but satisfactory detoxication of additional quantities of the water dry effluent, would not be effected. Where benzene or ether are used, condensation of the vapors in this step yields a two layer condensate from which the valuable solvent can readily be separated for reuse.

The benzene-dinitrotoluene mixture is then steam distilled for removal of the solvent leaving the dinitrotoluene in liquid or solid form in the aqueous residue. The solvent is recycled for use in the extraction of further quantities of the adsorbent, which has in turn been saturated by additional dinitrotoluene from the water dry effluent. The valuable dinitrotoluene, either as a liquid or a solid can readily be separated and recovered from the still residue by conventional engineering procedures.

Having thus described the invention, what is claimed as new is:

1. A process for the removal of dinitrotoluene from a water wet adsorbent by extracting the dinitrotoluene with a water immiscible solvent in which the dinitrotoluene is relatively soluble.

2. The process as set forth in claim 1 in which said water immiscible solvent is benzene.

3. The process for recovering dinitrotoluene from a water wet adsorbent comprising extracting the dinitrotoluene from said water wet adsorbent with benzene at a temperature of from about 40° C. to about 70° C., and subsequently steam distilling the obtained solution of dinitrotoluene in benzene to recover separately the dinitrotoluene and the benzene.

LUDWIG F. AUDRIETH.
ARTHUR H. SWEENEY, Jr.

REFERENCES CITED

The following references are of record in the file of this patent:

UNITED STATES PATENTS

| Number | Name | Date |
|---|---|---|
| 852,441 | Lockwood | May 7, 1907 |
| 1,356,631 | Kennedy | Oct. 26, 1920 |
| 1,505,438 | Sherwood | Aug. 19, 1924 |
| 1,724,531 | Stratford | Aug. 13, 1929 |